US010152328B2

(12) United States Patent
Nickolls et al.

(10) Patent No.: US 10,152,328 B2
(45) Date of Patent: *Dec. 11, 2018

(54) SYSTEMS AND METHODS FOR VOTING AMONG PARALLEL THREADS

(75) Inventors: John R. Nickolls, Los Altos, CA (US); Lars Nyland, Carrboro, NC (US); Peter C. Mills, San Jose, CA (US); Jeremy Sugerman, Palo Alto, CA (US); Timothy Foley, Pleasant Hill, CA (US); Brian Fahs, Los Altos, CA (US); Michael Garland, Lake Elmo, MN (US); David P. Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/485,622

(22) Filed: May 31, 2012

(65) Prior Publication Data
US 2012/0239909 A1    Sep. 20, 2012

Related U.S. Application Data

(63) Continuation of application No. 12/054,322, filed on Mar. 24, 2008, now Pat. No. 8,200,947.

(51) Int. Cl.
*G06F 9/38* (2018.01)
*G06F 9/30* (2018.01)

(52) U.S. Cl.
CPC .......... *G06F 9/3851* (2013.01); *G06F 9/3009* (2013.01); *G06F 9/30087* (2013.01); *G06F 9/3887* (2013.01)

(58) Field of Classification Search
CPC .............................. G06F 11/183; G06F 11/187
USPC ............................................ 712/220; 714/97
See application file for complete search history.

(56) References Cited

U.S. PATENT DOCUMENTS

| 4,375,683 | A | * | 3/1983 | Wensley | 714/12 |
| 4,967,347 | A | * | 10/1990 | Smith et al. | 714/12 |
| 5,103,478 | A | * | 4/1992 | Matyas et al. | 380/280 |
| 5,572,620 | A | * | 11/1996 | Reilly et al. | 714/11 |
| 6,023,751 | A | * | 2/2000 | Schlansker et al. | 712/1 |
| 6,128,755 | A | * | 10/2000 | Bello et al. | 714/715 |
| 6,640,313 | B1 | * | 10/2003 | Quach | G06F 11/1641 712/1 |
| 6,769,121 | B1 | * | 7/2004 | Koyama et al. | 718/100 |
| 7,065,672 | B2 | * | 6/2006 | Long et al. | 714/11 |
| 7,627,723 | B1 | * | 12/2009 | Buck et al. | 711/155 |
| 2001/0034824 | A1 | * | 10/2001 | Mukherjee et al. | 712/215 |
| 2003/0131291 | A1 | * | 7/2003 | Morrison et al. | 714/54 |
| 2005/0216798 | A1 | * | 9/2005 | Yu | 714/718 |

(Continued)

*Primary Examiner* — Jacob Petranek

(74) *Attorney, Agent, or Firm* — Artegis Law Group, LLP

(57) ABSTRACT

One embodiment of the present invention sets forth a technique for efficiently performing voting operations within a multi-threaded parallel-processing system. A group of related parallel program threads executes within a processor core together in parallel. A new instruction, called a "vote" instruction, is introduced that enables a parallel program thread to post an individual vote within the context of the group of related threads and to receive the result of the vote. In this fashion, the vote instruction advantageously reduces overhead associated with inter-thread communication, thereby improving overall system performance.

22 Claims, 7 Drawing Sheets

(56) References Cited

U.S. PATENT DOCUMENTS

| | | | |
|---|---|---|---|
| 2005/0278567 A1* | 12/2005 | Wolfe et al. | 714/11 |
| 2006/0150186 A1* | 7/2006 | Grayver | 718/102 |
| 2007/0094669 A1* | 4/2007 | Rector et al. | 718/104 |
| 2007/0198792 A1* | 8/2007 | Dice et al. | 711/163 |
| 2008/0077773 A1* | 3/2008 | Julier | G06F 9/30021 712/210 |
| 2008/0184211 A1* | 7/2008 | Nickolls et al. | 717/140 |
| 2008/0220545 A1* | 9/2008 | Pelley | 438/14 |
| 2009/0048857 A1* | 2/2009 | Pepper | 705/1 |
| 2009/0132878 A1* | 5/2009 | Garland et al. | 714/729 |

\* cited by examiner

SYSTEMS AND METHODS FOR VOTING AMONG PARALLEL THREADS

CROSS-REFERENCE TO RELATED APPLICATIONS

This application is a continuation of U.S. patent application Ser. No. 12/054,322, filed Mar. 24, 2008 now U.S. Pat. No. 8,200,947, which is herein incorporated by reference in its entirety.

BACKGROUND OF THE INVENTION

Field of the Invention

Embodiments of the present invention relate generally to parallel processing and more specifically to systems and methods for voting among parallel threads.

Description of the Related Art

Typical parallel processing subsystems include at least one parallel processing unit (PPU) that may be configured to provide a high volume of computational throughput that is impractical to achieve with a single processing unit. The PPU may be configured to incorporate a plurality of processing cores, each capable of executing a parallel program on a plurality of processing engines. Each processing engine may be configured to execute an instance of the parallel program. Each executing instance of the parallel program, called a parallel program thread, or simply "thread," usually computes a portion of the overall results generated by the parallel program.

Parallel program threads that are participating in a parallel computation are often required to communicate with other participating parallel program threads. A particularly useful form of communication is a vote, which is commonly performed on vote data provided by each participating parallel program thread. In one example of communication among parallel program threads, each participating parallel program thread may provide a "yes" or "no" ("1" or "0") vote regarding a specific piece of state information associated with the parallel program thread. The votes are tallied, and the result is used to guide subsequent computations within the parallel processing subsystem. One common vote operation, referred to as a "vote any," computes whether at least one of the participating threads voted "yes" in the vote. The result of the vote any operation corresponds to a Boolean "OR" of all participating votes.

A practical application of a "vote any" operation may be found in a parallel search application, where each parallel program thread reports whether a specified search condition is found. If the search condition (i.e., a pattern match) is found by at least one thread, then the threads may be directed to process the finding. Otherwise, the threads may continue to search for a match.

Prior art voting operations in parallel processing subsystems typically include counting or combining a number, N, of votes using N sequential serial tallying steps. Each tallying step further requires a set of serial operations, including a synchronization step, a communication step, and a combination step. The serial nature of a conventional voting operation tends to degrade system performance because each vote operation typically involves multiple tallying steps, where each tallying step requires multiple system cycles. The synchronization, communication, and combination steps are typically very time-consuming in parallel systems because they involve synchronization and communication among several parallel threads and parallel processors.

Certain prior art single-instruction multiple-data (SIMD) systems include combining mechanisms that may improve performance of voting operations. For example, a global OR combination operation may be performed over multiple data channels from multiple processing engines within a SIMD processor. However, the availability of the result of the global OR combination operation is limited to one related SIMD instruction controller, which uses the result to control subsequent operations of the multiple processing engines. The results are usually not available to the processing engines executing instructions initiated by the SIMD instruction controller, because no data path is conventionally available for conveying global combination results to the related processing engines. Because of this limitation, the processing engines within a conventional SIMD system are unable to individually incorporate the results of a vote, thereby limiting the overall generality of a SIMD type of processing regime. Furthermore, in many multi-threaded parallel processing subsystems that may host multiple independently executing SIMD programs, cascading effects resulting from inefficient vote operations may further reduce overall performance.

As the foregoing illustrates, what is needed in the art is a technique for efficiently performing general voting operations within multi-threaded parallel processing systems.

SUMMARY OF THE INVENTION

One embodiment of the present invention sets forth a method for performing a vote operation for a group of parallel executing threads. The method includes the steps of receiving a vote instruction, receiving a ballot of vote data that includes vote data from each participating thread in the group of threads, computing a vote result based on the ballot of vote data and the vote instruction, and returning the vote result to at least one participating thread in the group of threads.

One advantage of the disclosed method is that the vote operation applies across all threads within a thread group (referred to herein as a warp), which provides efficient inter-thread communication within the warp. The inter-thread communication facilitated by the vote operation enables certain single-instruction multiple-thread (SIMT) parallel programs to achieve greater overall performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
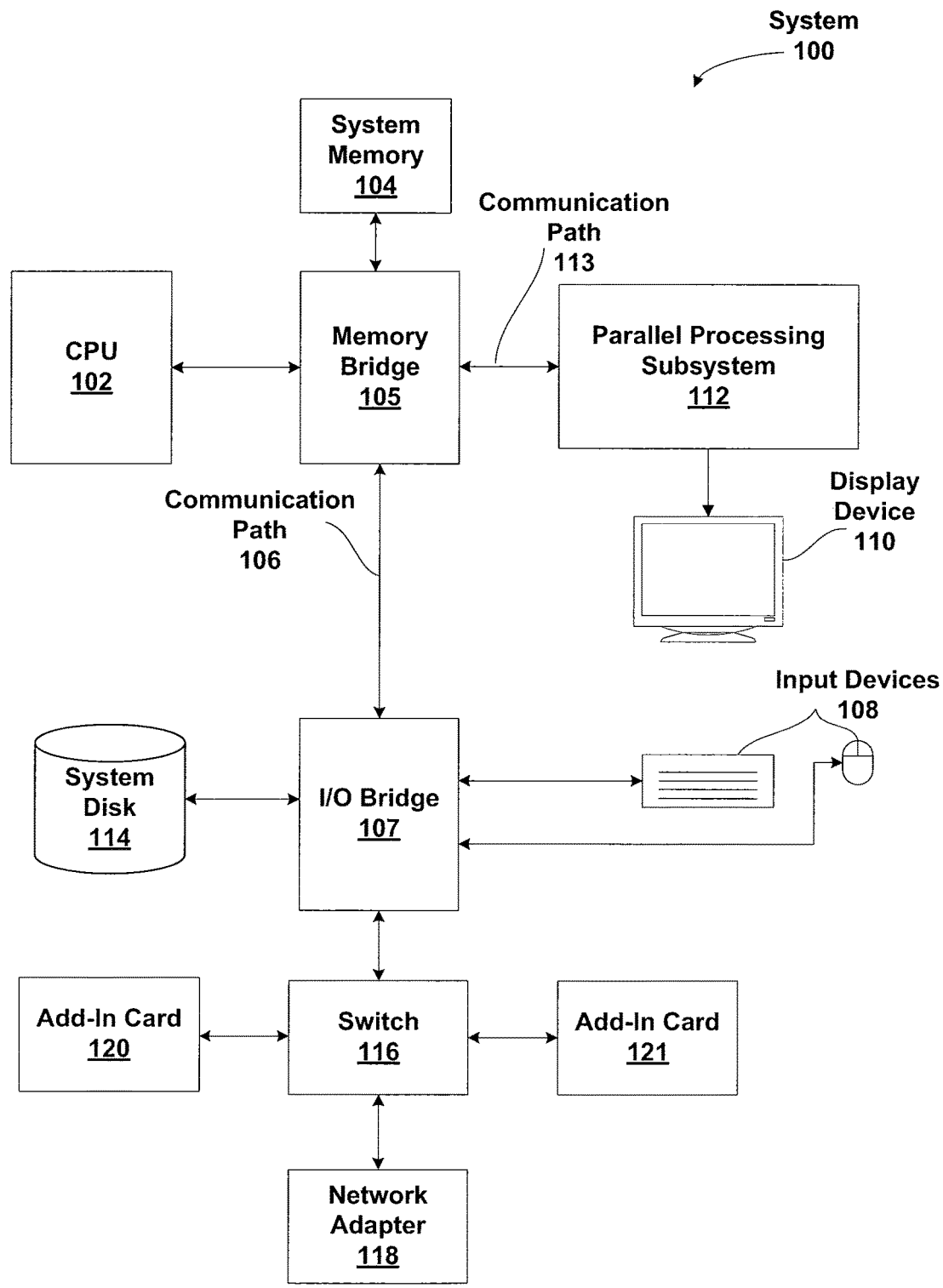
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
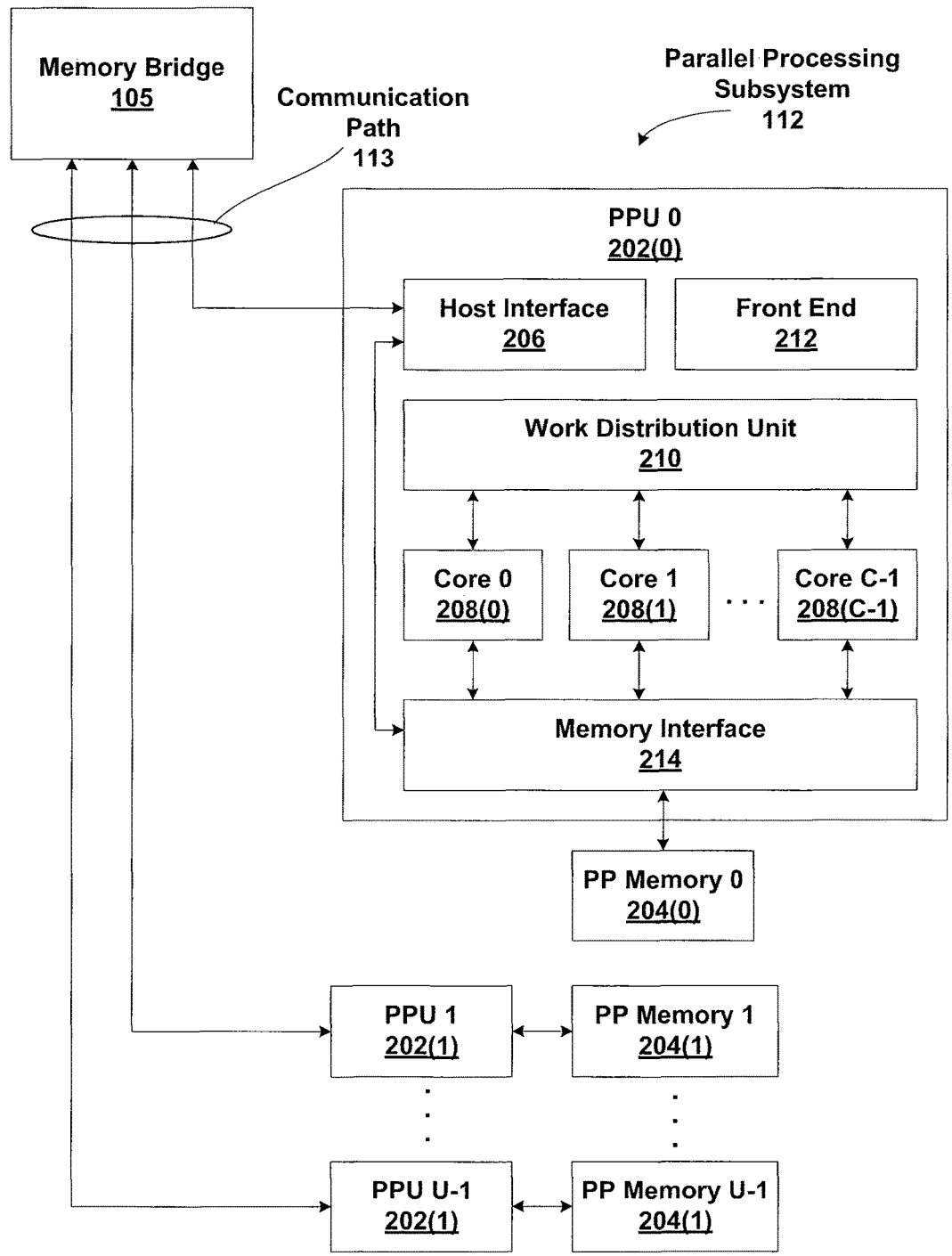
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≥1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3A:
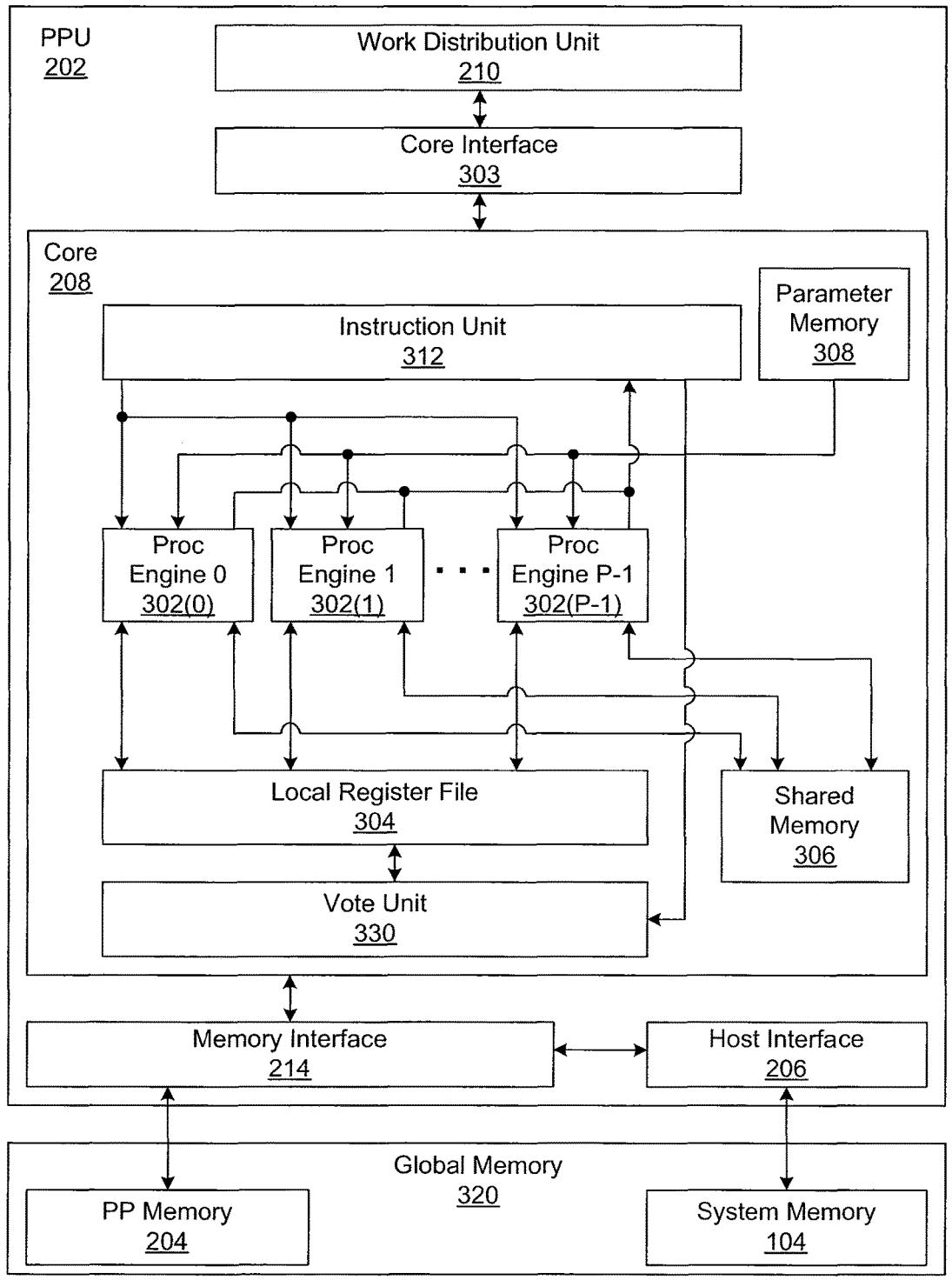
FIG. 3A is a block diagram of a parallel processing unit for the parallel processing subsystem of FIG. 2, in accordance with one or more aspects of the present invention.

FIG. 3A is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of thread groups simultaneously active on the core 208. The size of a CTA is generally determined by the programmer and the amount of hardware resources, such as memory or registers, available to the CTA.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMT execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 may issue the same instruction to all P processing engines 302 in parallel, core 208 is advantageously used to process threads in "SIMT thread groups." As used herein, a "SIMT thread group" or "warp" refers to a group of up to P threads of execution of the same program on different input data, with one thread of the group being assigned to each processing engine 302. A SIMT thread group may include fewer than P threads, in which case some of processing engines 302 will be idle during cycles when that SIMT thread group is being processed. A SIMT thread group may also include more than P threads, in which case processing will take place over consecutive clock cycles. Since each processing engine 302 can support up to G threads concurrently, it follows that up to G SIMT thread groups can be executing in core 208 at any given time.

On each clock cycle, one instruction is issued to all P threads making up a selected one of the G SIMT thread groups. To indicate which thread group is currently active, a warp identifier for the associated warp or thread group may be included with the instruction. Processing engine 302 uses the warp identifier as a context identifier, e.g., to determine which portion of its assigned lane in local register file 304 should be used when executing the instruction. Thus, in a given cycle, all processing engines 302 in core 208 are nominally executing the same instruction for different threads in the same SIMT thread group. In some instances, some threads in a SIMT thread group may be temporarily idle, e.g., due to conditional or predicated instructions, divergence at branches in the program, or the like.

The core 208 also includes a vote unit 330, which is configured to receive and execute instructions from the instruction unit 312 to compute vote results. The vote unit 330 computes a given vote result by processing data residing in certain registers within the local register file 304 that may be specified by an associated instruction. The vote unit 330 stores a given vote result in a plurality of registers within the local register file 304 such that related threads executing processing engines 302 may access to the vote result.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMT thread group in instruction unit 312, then signals instruction unit 312 to begin executing the threads. When execution of a thread or SIMT thread group is completed, core 208 advantageously notifies core interface 303. Core interface 303 can then initiate other processes, e.g., to retrieve output data from shared memory 306 and/or to prepare core 208 for execution of additional threads or SIMT thread groups.

It will be appreciated that the core architecture described in FIGS. 1, 2 and 3A is illustrative and that variations and modifications of this architecture fall within the scope of the present invention. For example, any number of processing engines may be included in each core 208. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3A in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Thread Arrays and Cooperative Thread Arrays

In some embodiments, multithreaded processing core 208 of FIG. 3A can execute general-purpose computations using thread blocks or thread arrays. A thread array consists of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3A. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set or produces one portion of the output data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using, the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Parallel Instructions for Voting Among Parallel Threads

Figure 3B:
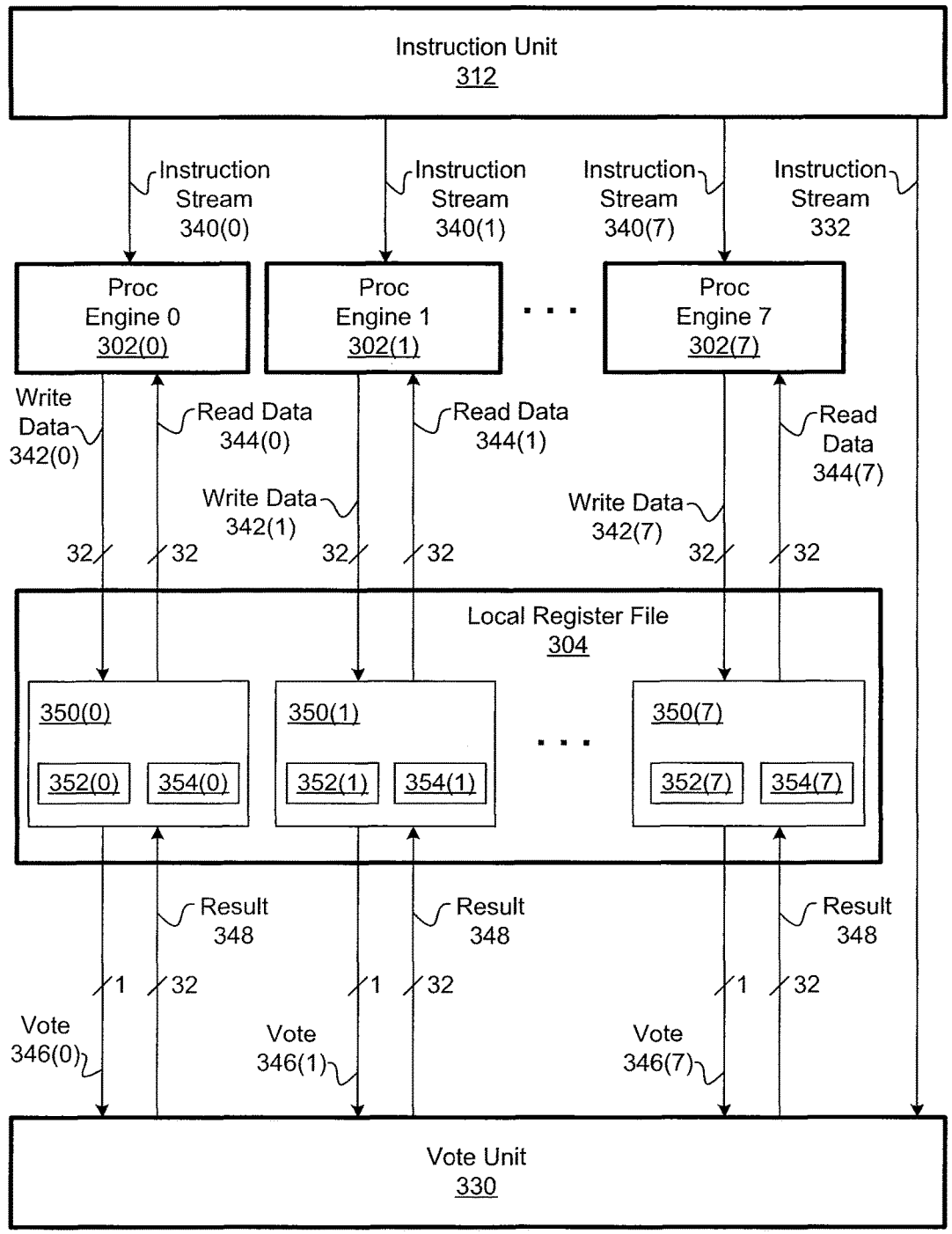
FIG. 3B is a detailed view of the core illustrated in FIG. 3A, according to one embodiment of the invention.

FIG. 3B is a detailed view of the core 208 illustrated in FIG. 3A, according to one embodiment of the invention. The instruction unit 312 generates instruction streams 340 to the processing engines 302 and an instruction stream 332 to the vote unit 330. In the course of executing instruction streams 340, processing engines 302 may store write data 342 within local register file 304 and retrieve read data 344 from local register file 304. The vote unit 330 is configured to execute the instructions within instruction stream 332. The vote unit 330 is further configured to retrieve vote source data 346 from local register file 304 and to generate result data 348 from the vote source data 346, according to the instructions within the instruction stream 332. The result data 348 is stored within the local register file 304. In one embodiment, write data 342, read data 344, and result data 348 values may be defined as 32-bit values, while the vote source data 346 values may be 1-bit values. Persons skilled in the art will recognize that different bit-widths may be used in alternative embodiments, e.g. vote source data 346 may comprise multi-bit values, or result data 348 may comprise some other multi-bit or one-bit value and may be reduced using one or more Boolean operations, without departing from the scope of the invention.

Storage space within the local register file 304 may be beneficially organized for efficient access by each processing engine 302. In one embodiment, the storage space within the local register file 304 may be partitioned into register sets 350, corresponding to processing engines 302. For example register set 350(0) may be associated with processing engine 302(0); register set 350(1) may be associated with processing engine 302(1); and so forth. Each processing engine 302 may be configured to directly and efficiently access individual registers within a corresponding register set 350 via electrical paths established for write data 342 and read data 344. Further, the vote unit 330 may be configured to simultaneously access registers within each of the register sets 350.

Each register set 350 includes at least one source register 352 and at least one destination register 354. In some embodiments, any register of register set 350 may be designated as the source register 352 for a given instruction. Similarly, any register of register set 350 may be designated as the destination register 354 for a given instruction. One bit from each source register 352 (e.g., bit zero) may be designated as vote source data 346 when the local register file 304 is read by the vote unit 330. The vote bits, concatenated together, form a ballot. As described, the vote unit 330 simultaneously receives multiple individual bits of vote source data 346, corresponding to one bit from each source register 352 stored in register sets 350. Again, the multiple individual bits of vote source data 346 collectively form the ballot. The vote unit 330 computes result data 348 from the ballot. The result data 348 is then copied to each destination register 354. In this way, threads executing on each processing engine 302 may access the same result data 348 stored in the different destination registers 354.

In one embodiment, core 208 includes eight processing engines 302(0) through 302(7) with a native word size of 32 bits. Register sets 350(0) through 350(7) are provided for the eight processing engines 350. Each register set 350 includes a plurality of 32-bit registers, of which one may be designated a source register 352 and one may be designated a destination register 354 by a vote instruction. Each processing engine 302 incorporates a dedicated data path to the local register file 304 for 32-bit read data 342 and 32-bit write data 344. In some embodiments, warps consisting of more threads than processing engines may execute on the processing engines through a regime of time interleaving. For example, a warp consisting of 32 threads may execute on eight processing engines 302 over the course of four instruction cycles. Persons skilled in the art will recognize that core 208 may include a different number of processing engines 302 and register sets 350, without departing from the scope of the invention.

Figure 4A:
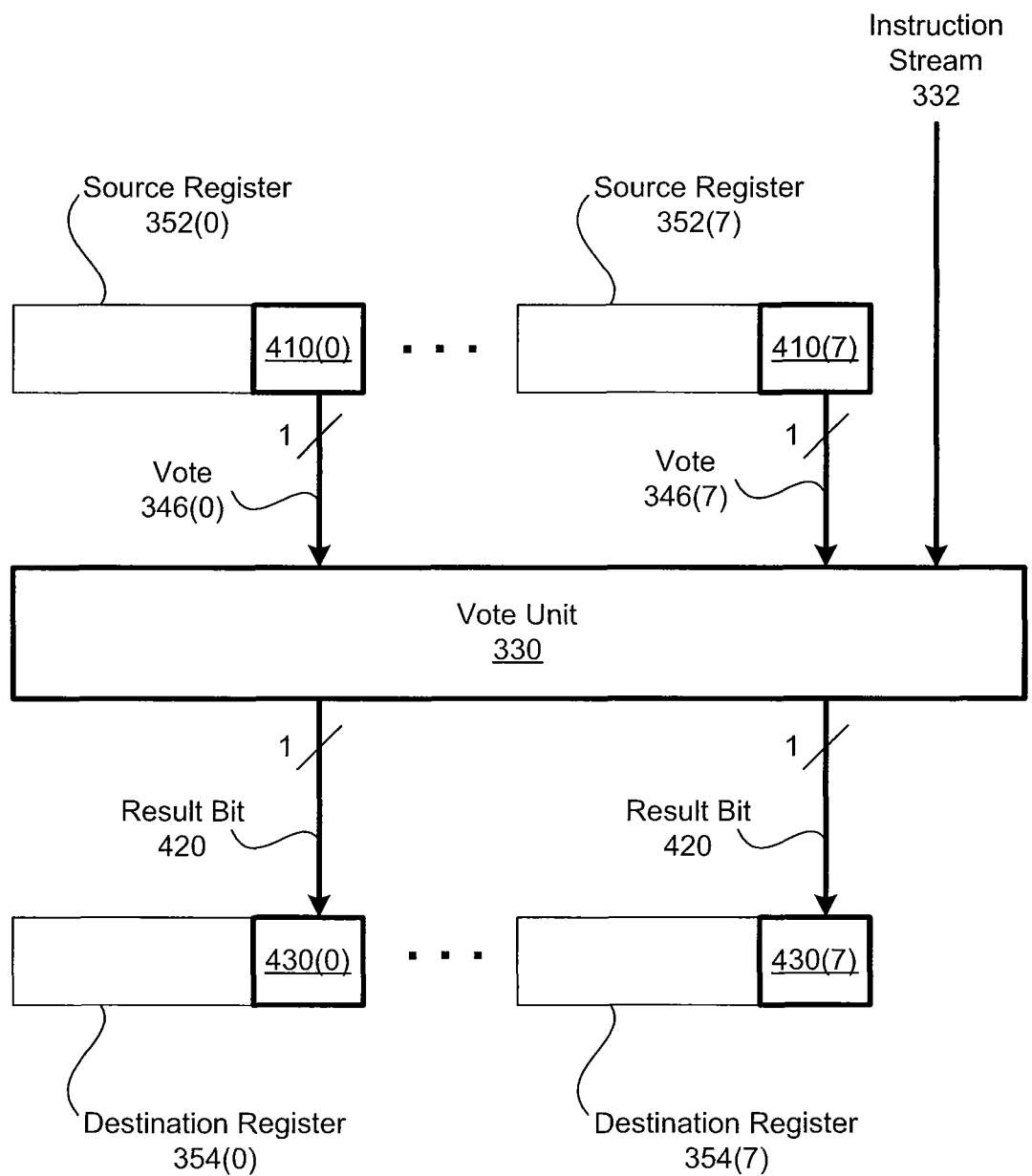
FIG. 4A illustrates a vote operation performed by the vote unit to generate a result bit, according to one embodiment of the invention.

FIG. 4A illustrates a vote operation performed by the vote unit 330 to generate a result bit 420, according to one embodiment of the invention. One bit 410 from each source register 352 residing in the local register file 304 is selected as the vote 346 associated with the thread corresponding to register 352. When the vote unit 330 receives an instruction from the instruction stream 332 to perform a vote operation, the votes 346 are processed by the vote unit 330 to generate a result bit 420. The result bit 420 is then written to a selected bit 430 within each of destination registers 354 (residing in local register file 304). Other bits of each destination register 354 may also be written with result bit 420, or a different value, or not written.

In one embodiment, a vote instruction within the instruction stream 332 causes the vote unit 330 to perform a vote operation, as described above. This vote instruction may be written as "VOTE.op Rd, Rs." The vote instruction includes three fields: an ".op" field, an "Rd" field, and an "Rs" field. The ".op" field specifies an operation code ("opcode"). The "Rs" field specifies a source register 352 from each set of registers 350 within the local register file 304. The "Rd" field specifies a destination register 354 from each set of registers 350 within the local register file 304. The operation of the VOTE instruction may be conditionally enabled or disabled in individual threads of the warp, by conditioning or predicating the VOTE instruction on the value of a register previously written by each thread. Only "active" threads participating in the VOTE instruction contribute to the vote result. The number of positive (value 1) votes within a given ballot of votes defines a vote population count (POPCOUNT). The vote unit 330 may count the number of positive votes in a ballot to establish a POPCOUNT. Many of the vote operations can be formed more simply with Boolean reduction functions such as AND, OR, and XOR rather than computing the POPCOUNT. For example, VOTE.ANY is a Boolean OR, VOTE.ALL is a Boolean AND of the participating votes. In other embodiments, the vote unit may perform an opcode specified by one of the operations illustrated below in Table 1, where N is the number of threads participating in the VOTE instruction.

TABLE 1

| VOTE.op Operation | True Condition |
| --- | --- |
| ANY | POPCOUNT > 0 |
| ! ANY (NONE) | POPCOUNT = = 0 |
| ALL | POPCOUNT = = N |
| ! ALL | POPCOUNT < N |
| EQ | (POPCOUNT = = 0) \|\| (POPCOUNT = = N) |
| MAJORITY | POPCOUNT >= N/2 |
| !MAJORITY | POPCOUNT < N/2 |

When the "true condition" shown in Table 1 is satisfied, the result bit 420 is set to true, and a "1" is written in the selected bit 430 of each destination register 354. More specifically, a VOTE.ANY instruction returns a true when one or more threads in the associated warp have written a "1" into a corresponding source register 352, which is equivalent to the Boolean OR of the vote source data bits supplied by the participating threads. A VOTE.NONE instruction returns a true when none of the threads in the associated warp have written a "1" into corresponding source registers 352. A VOTE.ALL instruction returns a true when all participating threads in the associated warp have written a "1" into corresponding source registers 352. A VOTE.!ALL instruction returns a true when some or none, but not all, of the participating threads in the associated warp have written a "1" into an associated source registers 352. A VOTE.EQ instruction returns a true when all active threads in the associated warp have written a "1" into corresponding source registers 352 or all threads have written a "0" into corresponding source registers 352. A VOTE.MAJORITY instruction returns a true when at least half the threads have written a "1" into their corresponding source registers 352. A VOTE.!MAJORITY instruction returns a true when less than half the active threads have written a "1" into their corresponding source registers 352. Persons skilled in the art will recognize that additional operations may be performed on ballot data to generate a result bit within the framework of the invention, without departing from the scope of the invention.

Figure 4B:
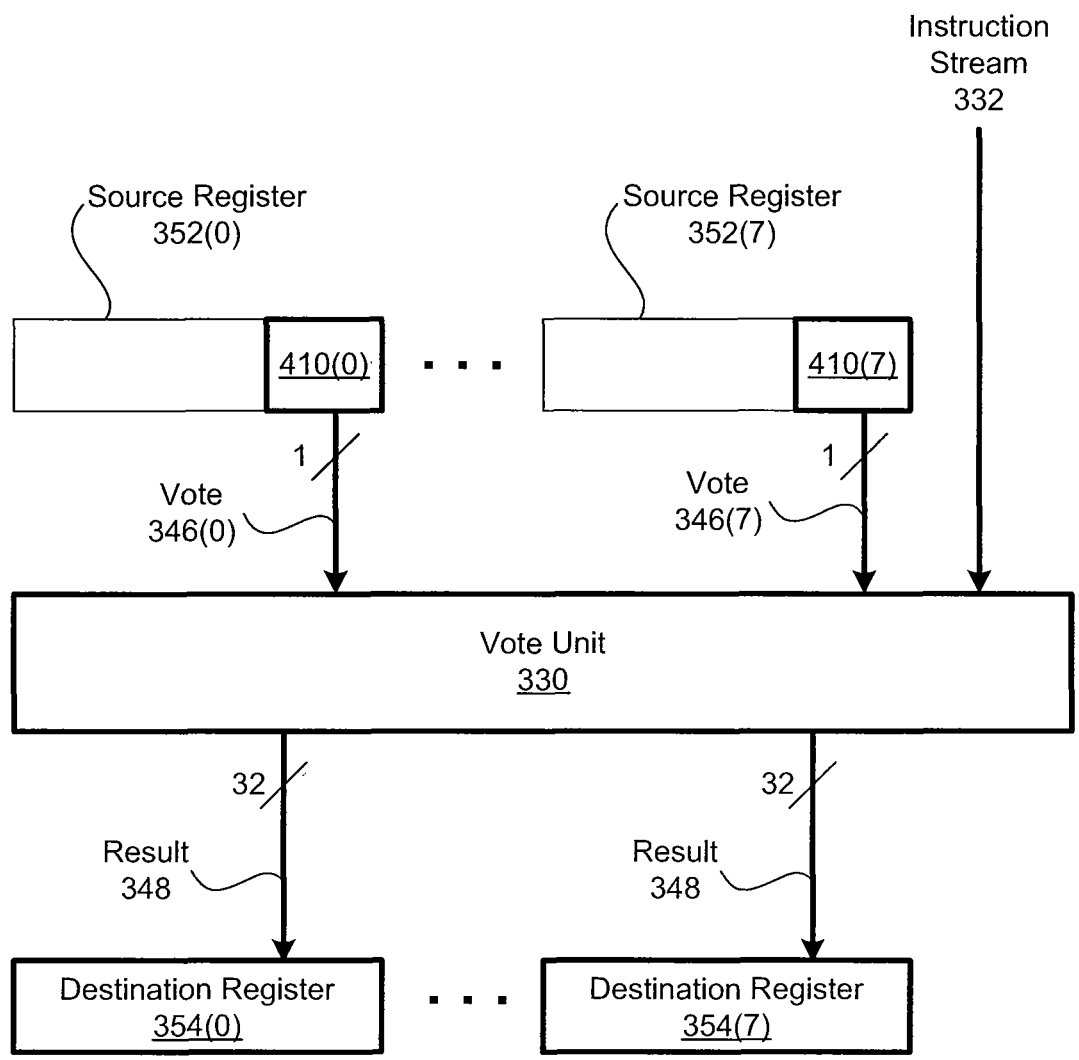
FIG. 4B illustrates a vote operation performed by the vote unit to generate a result word, according to one embodiment of the invention.

FIG. 4B illustrates a vote operation performed by the vote unit 330 to generate a result 348, according to one embodiment of the invention. Again, one bit 410 from each source register 352 (residing in the local register file 304) is selected as the source vote 346 supplied by the thread corresponding to the source register 352. When the vote unit 330 receives an instruction from the instruction stream 332 to perform a vote operation, the votes 346 are processed by the vote unit 330 to generate a result 348. The result 348 may be a complete word (e.g., 32-bits) that is then written to each of the destination registers 354 (residing in local register file 304).

In certain embodiments, the vote unit may perform an opcode specified by one of the operations illustrated below in Table 2.

TABLE 2

| VOTE.op Operation | Return Value |
| --- | --- |
| BALLOT | Return individual votes of threads in the warp. |
| POPCOUNT | Return POPCOUNT |

The "return value" shown in Table 2 may be computed from a ballot of votes. A VOTE.BALLOT instruction returns the ballot of votes input into the vote unit 330 to each thread within a warp of threads. The ballot contains zero votes for inactive threads that are not participating in the vote instruction. More specifically, the vote unit 330 returns the ballot of votes as the result 348 to the different sets of destination registers 354, each set corresponding to a different thread with a warp. In this fashion, all threads within the warp can beneficially obtain the vote of every other thread within the warp. A VOTE.POPCOUNT instruction returns a count of true votes as a count value, such as a binary count value, to each thread within a warp, via the corresponding destination registers 354.

In further embodiments, the VOTE instruction may be extended to include opcodes that perform additional useful parallel computations. For example, the VOTE instruction may be extended to include a scan operation, whereby the VOTE instruction may take the form "VOTE.SCAN.op Rd, Rs." In this scenario, the opcode field may be "ANY," "ALL," or "EQ." Each VOTE.SCAN.op instruction may generate a unique bit of data for each thread that represents the result of performing the specified operation on all threads with a lower or equal thread ID. For example, consider a ballot of votes including {1, 1, 1, 1, 0, 1, 1, 0}, corresponding to the votes of thread IDs 0, 1, 2, 3, 4, 5, 6, 7. With this ballot of votes, a VOTE.SCAN.ALL scanning left to right would generate {1, 1, 1, 1, 0, 0, 0, 0}. For thread IDs 5 through 7, not all the votes from threads with lower thread IDs are true ("1"); therefore, the corresponding outputs are "0."

Another embodiment includes an enumeration instruction, "VOTE.ENUM," which represents a combination of VOTE.POPCOUNT and VOTE.SCAN instructions. The VOTE.ENUM instruction counts the number of true votes from participating threads with thread IDs below a given thread ID. VOTE.ENUM returns a potentially unique result value to the destination register corresponding to each participating thread. By contrast, the previously discussed instruction essentially broadcasts one result 348 to every destination register 354.

Figure 5:
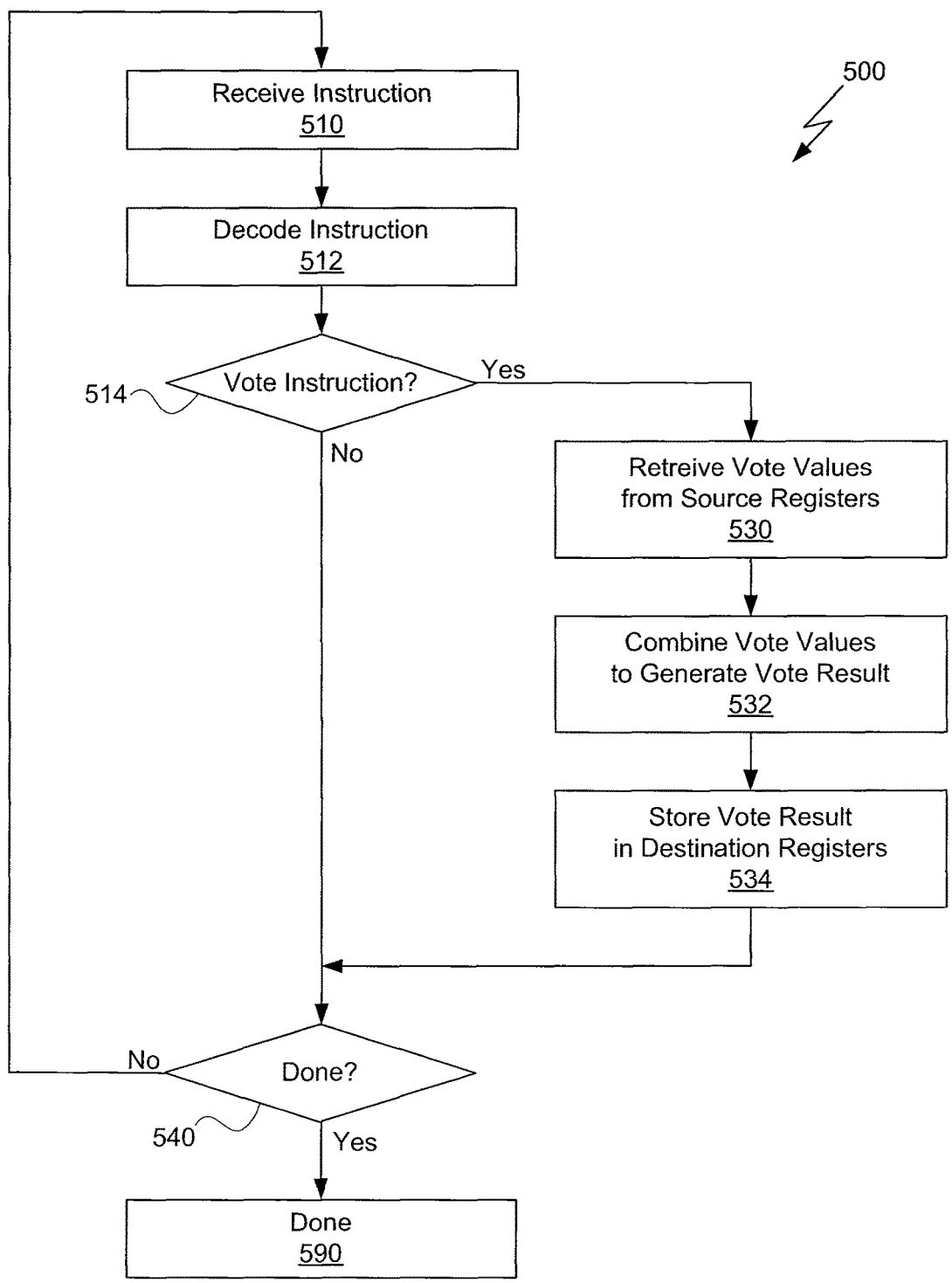
FIG. 5 is a flow diagram of method steps for performing a vote operation, according to one embodiment of the invention.

FIG. 5 is a flow diagram of method steps 500 for performing a vote operation, according to one embodiment of the invention. Although the method steps are described in conjunction with the systems of FIGS. 1-4B, persons skilled in the art will understand that any system configured to perform the method steps, in any order, is within the scope of the invention.

The method begins in step 510, where the vote unit 330 receives an instruction. In step 512, the vote unit 330 decodes the instruction. In alternate embodiments, the instruction unit 312 may decode the instruction. If, in step 514, the decoded instruction is a vote instruction, then the method proceeds to step 530, where the vote unit 330 retrieves vote values from the source registers 352, stored within the local register file 304 of FIG. 3A. In step 532, the vote unit 330 combines the vote values and generates a vote result, using any technically feasible combining function. In one embodiment, the vote result is a single bit that indicates a true ("1") or false ("0") value, as computed by the selected combining function. In other embodiments, the vote result may be a multi-bit value. In yet other embodiments, the vote source data and results may be multi-bit values. As discussed previously, the multi-bit value may represent various types of results, such as a ballot of votes or a count of votes that meet a certain criteria within the context of the selected combining function. Tables 1 and 2, above, illustrated certain useful combining functions. However, persons skilled in the art will recognize that other combining functions may be implemented, without departing from the scope of the invention. In step 534, the vote unit 330 directs the local register file 304 to store the vote result. In one embodiment, the vote result is stored in the selected bit 430 within the selected destination register 354. In other embodiments, the vote result may be stored in multiple bits within the destination register 354. If, in step 540, processing is not done, then the method proceeds to step 510.

Returning to step 514, if the decoded instruction is not a vote instruction, then the method proceeds to step 540. If, in step 540, processing is done, then the method terminates in step 590.

In sum, a system and method for efficiently computing votes over a group of parallel threads within a parallel processing system is disclosed. Each thread may participate in a vote by executing a VOTE instruction, which names a source and destination register within a local register space. The votes are combined by a vote unit, which reads the selected source registers and performs a specified combination operation to generate a result. The result is then written into the selected destination registers for use by the participating threads. The VOTE instruction applies across threads within a group of parallel threads, providing efficient inter-thread communication within the group. The efficient inter-thread communication facilitated by the VOTE instruction enables certain parallel programs to achieve greater overall performance.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for performing a vote operation for a group of threads executing in parallel within a processor core, the method comprising:
receiving a vote instruction that includes an opcode that identifies the vote operation and a first register field that identifies a source register;
receiving a ballot of vote data that includes vote data from a plurality of corresponding source registers within a core of a processor, wherein the vote data is generated by each participating thread in the group of threads executing in parallel on different data, each source register is identified by the first register field, and each source register is associated with a different participating thread in the group of threads executing in parallel within the core of the processor;
computing a vote result based on the ballot of vote data according to the vote instruction; and
returning the vote result to the group of threads.

2. The method of claim 1, wherein the step of computing a vote result comprises computing one vote result, and the step of returning the vote result comprises broadcasting the one vote result to each participating thread in the group of threads.

3. The method of claim 2, wherein the vote result comprises a Boolean reduction of the ballot of vote data.

4. The method of claim 3, wherein the vote result comprises one bit.

5. The method of claim 4, wherein the vote result is true if the vote data from any thread in the group of threads is true.

6. The method of claim 4, wherein the vote result is true if no vote data from any participating thread in the group of threads is true.

7. The method of claim 4, wherein the vote result is true if the vote data from all of the participating threads in the group of threads is true.

8. The method of claim 4, wherein the vote result is true if the vote data from at least one participating thread in the group of threads is false.

9. The method of claim 4, wherein the vote result is true if the vote data from all of the participating threads in the group of threads is identical.

10. The method of claim 4, wherein the vote result is true if the vote data from at least half of the participating threads in the group of threads is true.

11. The method of claim 4, wherein the vote result is true if the vote data from less than half of the participating threads in the group of threads is true.

12. The method of claim 1, wherein the vote result comprises the ballot of vote data received from the participating threads.

13. The method of claim 1, wherein the vote result comprises a count of the true votes in the ballot of vote data.

14. The method of claim 1, wherein the step of computing a vote result comprises computing a separate vote result for each participating thread in the group of threads, and the step of returning the vote result comprises transmitting each separate vote result to a corresponding participating thread in the group of threads.

15. The method of claim 14, wherein each of the separate vote results is unique.

16. The method of claim 14, wherein the separate vote result for a corresponding participating thread is computed across all participating threads in the thread group having a thread identifier that is equal to or less than a thread identifier associated with the corresponding participating thread.

17. The method of claim 14, wherein the separate vote result for a corresponding participating thread comprises a count of the true votes in the ballot of vote data associated with the participating threads in the group of threads having a thread identifier that is less than a thread identifier associated with the corresponding participating thread.

18. The method of claim 1, wherein the vote data received from each participating thread in the group of threads comprises one bit.

19. The method of claim 1, wherein the vote instruction is included in an instruction stream, and further comprising the steps of decoding the instruction stream and identifying the vote instruction.

20. The method of claim 1, wherein the participating threads in the group of threads execute across a plurality of processing engines in a processor core in a single-instruction multiple-thread execution paradigm.

21. The method of claim 1, wherein:
the vote instruction further includes a second register field that identifies a destination register, and
returning the vote result further comprises causing the vote result to be written to a plurality of corresponding destination registers identified by the second register field, wherein each corresponding source register is associated with a different participating thread in the group of threads.

22. The method of claim 1, wherein a vote unit within the core of the processor receives the vote instruction, receives the ballot of vote data, computes the vote result, and returns the vote result.

* * * * *